US012763278B2

(12) United States Patent
Song et al.

(10) Patent No.: US 12,763,278 B2
(45) Date of Patent: Oct. 13, 2026

(54) SEMICONDUCTOR CIRCUIT BREAKER AND OVERVOLTAGE SUPPRESSION UNIT OF SEMICONDUCTOR CIRCUIT BREAKER

(71) Applicant: LS ELECTRIC CO., LTD., Anyang-si (KR)

(72) Inventors: Woonghyeob Song, Anyang-si (KR); Dongjin Yun, Anyang-si (KR); Sunghee Kang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 322 days.

(21) Appl. No.: 18/575,615

(22) PCT Filed: May 20, 2022

(86) PCT No.: PCT/KR2022/007257
§ 371 (c)(1),
(2) Date: Dec. 29, 2023

(87) PCT Pub. No.: WO2023/282461
PCT Pub. Date: Jan. 22, 2023

(65) Prior Publication Data

US 2024/0312752 A1 Sep. 19, 2024

(30) Foreign Application Priority Data

Jul. 8, 2021 (KR) ........................ 10-2021-0089874

(51) Int. Cl.
*H01H 85/046* (2006.01)
*H01H 85/041* (2006.01)
*H01H 85/02* (2006.01)

(52) U.S. Cl.
CPC ...... *H01H 85/046* (2013.01); *H01H 85/0411* (2013.01); *H01H 2085/0283* (2013.01)

(58) Field of Classification Search
CPC ............. H01H 85/046; H01H 85/0411; H01H 2085/0283; H01H 85/0241; H02H 3/20;
(Continued)

(56) References Cited

U.S. PATENT DOCUMENTS 8,729,739 B2 5/2014 Lubomirsky et al.
9,755,630 B2 9/2017 Urciuoli
(Continued)

FOREIGN PATENT DOCUMENTS

| | | | |
|---|---|---|---|
| JP | 09129403 | A | 5/1997 |
| JP | 2016004783 | A | 1/2016 |
| KR | 20150050522 | A | 5/2015 |
| KR | 2020170001929 | U | 6/2017 |
| KR | 101977018 | B1 | 5/2019 |

(Continued)

OTHER PUBLICATIONS

International Search Report for related International Application No. PCT/KR2022/007257; action dated Jan. 12, 2023; (2 pages).
(Continued)

*Primary Examiner* — Jacob R Crum
(74) *Attorney, Agent, or Firm* — K&L Gates LLP

(57) ABSTRACT

The present disclosure relates to an overvoltage suppression unit provided in a semiconductor circuit breaker using a semiconductor switch for power, the overvoltage suppression unit comprising: an overvoltage suppression element unit disposed on a first surface of a printed circuit board and including at least one overvoltage suppression element; a pattern fuse connected to the overvoltage suppression element unit and patterned on the first surface of the printed circuit board; a first case forming a housing and covering the first surface of the printed circuit board on which the pattern fuse and the overvoltage suppression element unit are disposed; and a lead wire connected to the pattern fuse, wherein the lead wire is formed so as to connect the first surface of the printed circuit board and a second surface of the printed circuit board.

15 Claims, 6 Drawing Sheets

(58) Field of Classification Search
CPC ............ H02H 7/20; H02H 9/04; H02H 7/205; H02H 9/044; H05K 1/02; H05K 1/11; H05K 3/34; H05K 1/0293; H05K 1/115; H05K 3/3447
See application file for complete search history.

(56) References Cited

U.S. PATENT DOCUMENTS

| | | | | |
|---|---|---|---|---|
| 2003/0133246 | A1* | 7/2003 | Masghati ................ | H04M 3/18 361/119 |
| 2007/0159759 | A1* | 7/2007 | Chen .................. | H01R 13/6666 361/118 |
| 2021/0126447 | A1 | 4/2021 | Miller et al. | |
| 2022/0340020 | A1* | 10/2022 | Papadopoulos .......... | B60K 1/04 |

FOREIGN PATENT DOCUMENTS

| | | | |
|---|---|---|---|
| KR | 101985499 | B1 | 5/2019 |
| KR | 20200024069 | A | 3/2020 |
| KR | 20200126278 | A | 11/2020 |
| WO | 2014204746 | A1 | 12/2014 |
| WO | 2019237221 | A1 | 12/2019 |

OTHER PUBLICATIONS

Written Opinion for related International Application No. PCT/KR2022/007257; action dated Jan. 12, 2023; (4 pages).
Search Report for related Korean Application No. 10-2021-0089874; action dated Jul. 29, 2021; (14 pages).
Notice of Allowance for related Korean Application No. 10-2021-0089874; action dated Aug. 22, 2023; (2 pages).

* cited by examiner (a)

(b)

(a)

(b)

(a)

(b)

SEMICONDUCTOR CIRCUIT BREAKER AND OVERVOLTAGE SUPPRESSION UNIT OF SEMICONDUCTOR CIRCUIT BREAKER

CROSS-REFERENCE TO RELATED APPLICATIONS

This application is the National Stage filing under 35 U.S.C. 371 of International Application No. PCT/KR2022/007257, filed on May 20, 2022, which claims the benefit of earlier filing date of and rights of priority to Korean Application 10-2021-0089874, filed on Jul. 8, 2021, the contents of which are all hereby incorporated by reference herein in their entirety.

FIELD

The present disclosure relates to a semiconductor circuit breaker using a semiconductor switch for power, and more particularly, to an overvoltage suppression unit configured to suppress overvoltage generated in the semiconductor circuit breaker.

BACKGROUND

When a failure occurs in a power system that supplies power, abnormal current such as overcurrent or fault current may flow into a load through the power system. The abnormal current flowing into the load may cause a damage to the load. Accordingly, when a failure occurs in the power system, a circuit breaker configured to block a load from the power system to block the abnormal current from flowing into the load may be used.

In a case of a mechanical circuit breaker in the related art, there is such a problem that it takes a relatively long time of several tens of msec for the circuit to be blocked and abnormal current flows into a load during the time. Therefore, these days, semiconductor circuit breakers (solid-state circuit breakers (SSCBs)) including a switch capable of conducting large current and made of a power semiconductor with a high-speed switching frequency to cut off current at a high speed are being used.

A general semiconductor circuit breaker may include at least one semiconductor switch disposed between a power source side (power system) and a load. When a failure occurs on the power source side or a load side, the at least one semiconductor switch for power may be turned off to disconnect the power source side from the load side. Thus, a flow of abnormal current into the load side or the power source side may be prevented.

However, as such, when a circuit is disconnected through a semiconductor switch, a voltage at both ends of the semiconductor switch for power may increase due to current that has been already introduced. Additionally, when a voltage according to the current that has been introduced, i.e., residual current exceeds a certain level, components inside the circuit breaker may be damaged due to overvoltage.

Thus, various methods for dissipating the residual current have emerged to protect inside of a circuit breaker, and as an examples of these methods, as shown in FIG. 1, a method of connecting an element 110 capable of absorbing overvoltage (hereinafter referred to as an overvoltage suppression element) such as a transient voltage suppressor (TVS) diode or a Zener diode to both ends of a semiconductor switch 100 for power has emerged. In this case, the overvoltage suppression element 110 has advantages such that internal damage caused by overvoltage may be prevented by effectively absorbing overvoltage generated by the residual current, and a size of the circuit breaker may be greatly reduced due to very small volume of the overvoltage suppression element 110.

However, a magnitude of voltage that may be suppressed by the overvoltage suppression element 110 through absorption is limited. Therefore, when a voltage generated due to the residual current exceeds a threshold level, the overvoltage suppression element 110 may not absorb the voltage, and thus, may be damaged. When the overvoltage suppression element 110 is damaged, an isolator latch of the overvoltage suppression element 110 may be opened and an arc may occur. When the arc occurs, there may be a problem such that not only the overvoltage suppression element 110, but also components inside the circuit breaker may be damaged due to the arc.

Accordingly, to prevent damages to the overvoltage suppression element 110 and the components inside the circuit breaker due to overvoltage above a threshold level, methods of disconnecting the overvoltage suppression element 110 when overvoltage exceeding a certain level is applied have been devised. As part of these methods, a method of connecting both ends of the semiconductor switch unit 100 and the overvoltage suppression element 110 using a thermal fuse has been introduced. The thermal fuse is a fuse that is blown according to a temperature. When a temperature in a periphery of the overvoltage suppression element 110 increases due to overvoltage, the thermal fuse is blown to disconnect the overvoltage suppression element from a circuit, thereby protecting the overvoltage suppression element 110.

However, when the thermal fuse is blown, a high-voltage potential difference may occur between both sectional surfaces of the blown fuse, and accordingly, an electrostatic discharge phenomenon, i.e., an arc may occur. Thus, a general thermal fuse is configured such that a protective material configured to absorb an arc that may occur when the fuse is blown is disposed to surround lead wires and a periphery of a fuse element connecting both lead wires to each other.

FIG. 2 illustrates a configuration of the general thermal fuse. Like the configuration of the general thermal fuse shown in FIG. 2, a general thermal fuse is configured such that a fusible alloy 200 is bonded as a fuse element between both lead wires 201 and 202, and a special resin 210 for maintaining operation performance is applied and sealed with a case 230 made of an insulating material. In addition, as a protective material 220 against an arc, an insulating material is filled inside the case 230, i.e., in a space between the special resin 210 and the case 230 so that an arc generated when the fuse is blown may be absorbed through a protective material inside the case 230.

Meanwhile, when a potential difference between the both sectional surfaces of the blown fuse is great, a strong arc may be generated. Thus, when a voltage is high, many protective materials are needed to completely absorb the arc. Accordingly, when a voltage at both ends of the semiconductor switch unit 100 is high, a large size of fuse for accommodating a great amount of protective materials may be needed. Therefore, there is a problem such that depending on a size of a fuse that is needed, a size of a semiconductor circuit breaker including the overvoltage suppression element 110 may also increase.

SUMMARY

Therefore, to obviate those problems, an aspect of the detailed description is to provide a semiconductor circuit breaker, while maintaining a small size, including an overvoltage suppression element capable of protecting inside of a circuit from overvoltage caused by residual current.

In addition, an aspect of the detailed description is to provide a semiconductor circuit breaker, while maintaining a small size, including a small-sized overvoltage suppression unit capable of not only protecting overvoltage suppression elements included therein by disconnecting a circuit when an overvoltage equal to or greater than a suppressible threshold occurs, but also protecting components inside the semiconductor circuit breaker from an arc generated due to the disconnection of the circuit.

To achieve these and other advantages and in accordance with the purpose of the present disclosure, as embodied and broadly described herein, there is provided an overvoltage suppression unit in a semiconductor circuit breaker, the overvoltage suppression unit including: an overvoltage suppression element unit disposed on a first surface of a printed circuit board and including at least one overvoltage suppression element; a pattern fuse connected to the at least one overvoltage suppression element unit and patterned on the first surface of the printed circuit board; a first case constituting a housing and covering the first surface of the printed circuit board, the pattern fuse and the overvoltage suppression element unit being disposed on the first surface; and a lead wire connected to the pattern fuse, wherein the lead wire is disposed to connect the first surface of the printed circuit board to a second surface of the printed circuit board.

According to an embodiment, the overvoltage suppression unit may further include a lead wire inlet which includes the lead wire and is disposed on the second surface of the printed circuit board and into which a lead connection wire protruding from a main printed circuit board of the semiconductor circuit breaker is introduced, the main printed circuit board of the semiconductor circuit breaker having circuit elements of the semiconductor circuit breaker disposed thereon, and the lead connection wire line may configured to: penetrate through the main printed circuit board to connect a first surface of the main printed circuit board to a second surface other than the first surface, the circuit elements on the main printed circuit board being disposed on the first surface; and protrude from the second surface of the main printed circuit board and when being introduced into the lead wire inlet, is connected to the lead wire in the lead wire inlet.

According to an embodiment, the lead connection wire may be connected to one end of a semiconductor switch unit in the semiconductor circuit breaker, the semiconductor switch unit including at least one semiconductor switch for power.

According to an embodiment, the overvoltage suppression unit may be disposed on the second surface of the main printed circuit board so that the lead connection wire is introduced into the lead wire inlet, and the second surface of the main printed circuit board may be disposed to face the second surface of the printed circuit board.

According to an embodiment, the overvoltage suppression unit may include a second case covering the second surface of the printed circuit board to block a space between the second surface of the main printed circuit board and the second surface of the printed circuit board, and including a through hole through which the lead wire inlet penetrates.

According to an embodiment, the second case may constitute a housing, and define a sealed internal space having a certain size between the second surface of the printed circuit board and the housing constituted by the second case such that an arc generated when the pattern fuse is blown is discharged into the sealed internal space.

According to an embodiment, at least one of the first case and the second case may be made of a flame-retardant material.

According to an embodiment, at least one of the first case and the second case may be configured by impregnating epoxy According to an embodiment, the printed circuit board and elements disposed on the printed circuit board are configured by impregnating epoxy.

According to an embodiment, the overvoltage suppression element unit may include a plurality of overvoltage suppression element arrays in which a plurality of overvoltage suppression elements are connected to each other in series, and the pattern fuse may connect the plurality of overvoltage suppression element arrays to each other to connect the plurality of overvoltage suppression element arrays in parallel with each other.

To achieve these and other advantages and in accordance with the purpose of the present disclosure, as embodied and broadly described herein, there is also provided a semiconductor circuit breaker including: a semiconductor switch unit including at least one semiconductor switch for power; a plurality of lead wires connected to both ends of the semiconductor switch unit and penetrating through a printed circuit board of the semiconductor circuit breaker to connect a first surface of the printed circuit board to a second surface of the printed circuit board, wherein the at least one semiconductor switch for power is disposed on the first surface, but is not disposed on the second surface, an overvoltage suppression element disposed on the second surface of the printed circuit board, and connected to the semiconductor switch unit in parallel through the plurality of lead wires to suppress a voltage increase caused by residual current generated from the both ends of the semiconductor switch unit when circuit connection is interrupted, and a plurality of fuses connecting each of the plurality of lead wires to both ends of the overvoltage suppression element, and patterned on the second surface of the printed circuit board.

According to an embodiment, the semiconductor circuit breaker may further include a first case covering one region of the second surface of the printed circuit board and made of a flame-retardant material, wherein the overvoltage suppression element is disposed and the plurality of fuses are patterned on the second surface.

According to an embodiment, the semiconductor circuit breaker may further include a second case covering one region of the first surface of the printed circuit board corresponding to the one region of the second surface of the printed circuit board on which the overvoltage suppression element is disposed and the plurality of fuses are patterned, and made of a flame-retardant material.

According to an embodiment, the printed circuit board may be partitioned into a first region on which the overvoltage suppression element is disposed and the plurality of fuses are patterned, and a second region on which circuit elements of the semiconductor circuit breaker, other than the overvoltage suppression element and the plurality of fuses, are disposed, and the first region and the second region may be disposed on different surfaces of the printed circuit board.

According to an embodiment, the overvoltage suppression element may include a plurality of overvoltage suppression element arrays in which a plurality of overvoltage suppression elements are connected to each other in series, and the plurality of fuses may connect the plurality of overvoltage suppression element arrays to each other to connect the plurality of overvoltage suppression element arrays in parallel with each other.

Effects of a semiconductor circuit breaker according to the present disclosure, and an overvoltage suppression unit included therein are described as follows.

According to at least one of the embodiments of the present disclosure, a printed circuit board (PCB) may include a patterned fuse (hereinafter, a pattern fuse), and at least one overvoltage suppression element may be connected through the pattern fuse to thereby greatly reduce a size of the pattern fuse. Accordingly, in the present disclosure, an effect of protecting overvoltage suppression elements from an overvoltage equal to or greater than a threshold, as well as reducing a size of the semiconductor circuit breaker may be obtained.

In addition, according to at least one of the embodiments of the present disclosure, the pattern fuse and the at least one overvoltage suppression element connected through the pattern fuse may be covered by a case made of a flame-retardant material to prevent an arc generated due to blowing of the pattern fuse from being leaked out of the overvoltage suppression unit. Accordingly, in the present disclosure, an effect of protecting components inside the semiconductor circuit breaker from an arc generated due to fuse disconnection, as well as reducing a size of the semiconductor circuit breaker may be obtained.

In addition, according to at least one of the embodiments of the present disclosure, the pattern fuse and the at least one overvoltage suppression element connected through the pattern fuse may be disposed on a second surface, other than a first surface on which other components in the semiconductor circuit breaker are disposed to thereby obtain an effect of protecting the other components in the semiconductor circuit breaker from an arc generated due to blowing of the pattern fuse, as well as reducing a size of the semiconductor circuit breaker.

DETAILED DESCRIPTION

It is noted that the technical terms used herein are used only to describe specific embodiments and are not intended to limit the disclosure. In addition, a singular representation used herein may include a plural representation unless it represents a definitely different meaning from the context. In general, a suffix such as "module" and "unit" may be used to refer to elements or components. Use of such a suffix herein is merely intended to facilitate description of the specification, and the suffix itself is not intended to give any special meaning or function.

In the present disclosure, the terms "comprising" and "including" should not be construed to necessarily include all of the elements or steps disclosed herein, and should be construed not to include some of the elements or steps thereof, or should be construed to further include additional elements or steps.

In addition, in describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. In addition, each of the embodiments described below, as well as combinations of embodiments, are changes, equivalents, or substitutes included in the spirit and technical scope of the present disclosure, and may fall within the spirit and technical scope of the present disclosure.

To facilitate a complete understanding of the present disclosure, a basic principle of the present disclosure will be described. In the present disclosure, an overvoltage suppression unit including a fuse patterned on a printed circuit board (PCB), i.e., a pattern fuse and at least one overvoltage suppression element is disposed between both ends of at least one semiconductor switch for power. Thus, the at least one overvoltage suppression element may be connected to the both ends of the at least one semiconductor switch for power through the pattern fuse. As such, by using a fuse patterned on a printed circuit board, a size of the fuse may be significantly reduced compared to an existing fuse.

In addition, since a flame-retardant case covers a first surface of the printed circuit board on which the pattern fuse and the at least one overvoltage suppression element are disposed, an arc that may occur when the pattern fuse is blown may be prevented from being leaked out of the overvoltage suppression unit.

Figure 1:
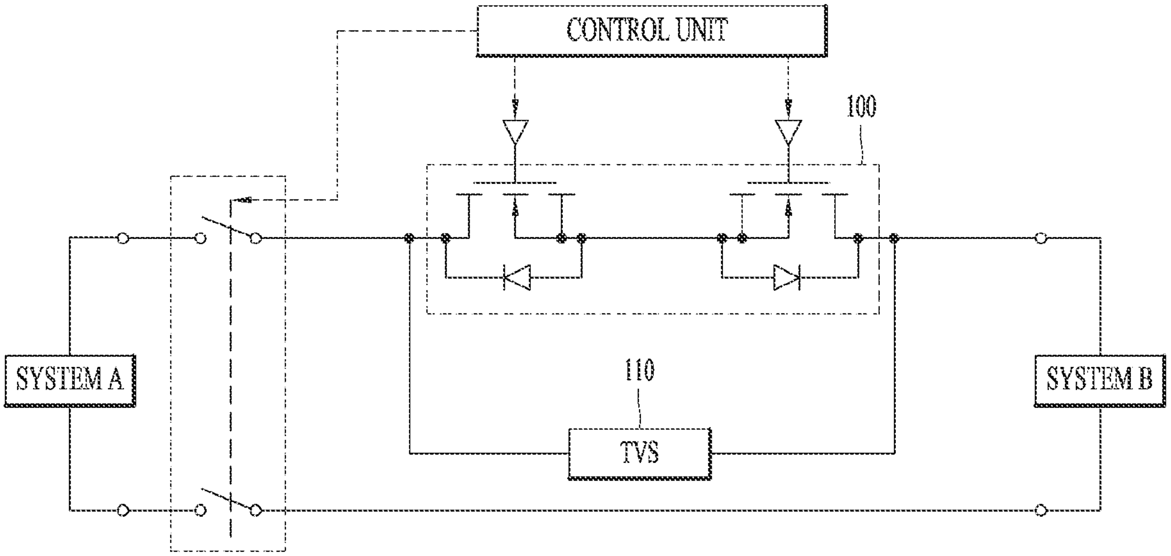
FIG. 1 is a configuration diagram of a semiconductor circuit breaker including an overvoltage suppression unit.
Figure 2:
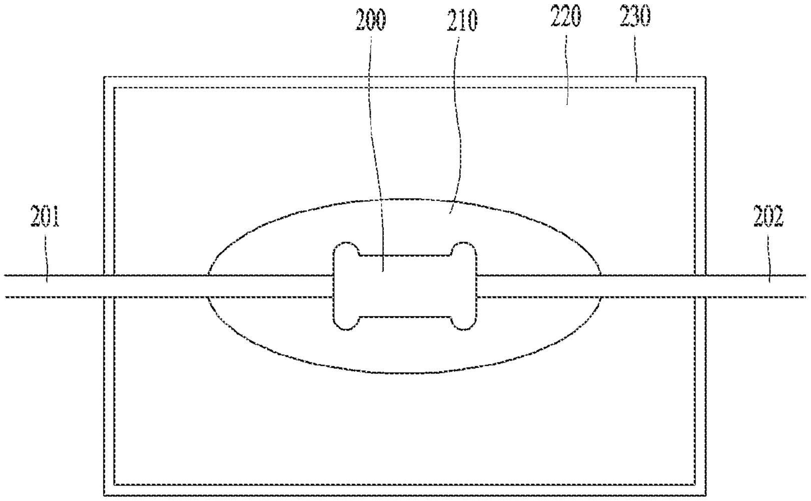
FIG. 2 illustrates an example of a configuration of a general thermal fuse.
Figure 3:
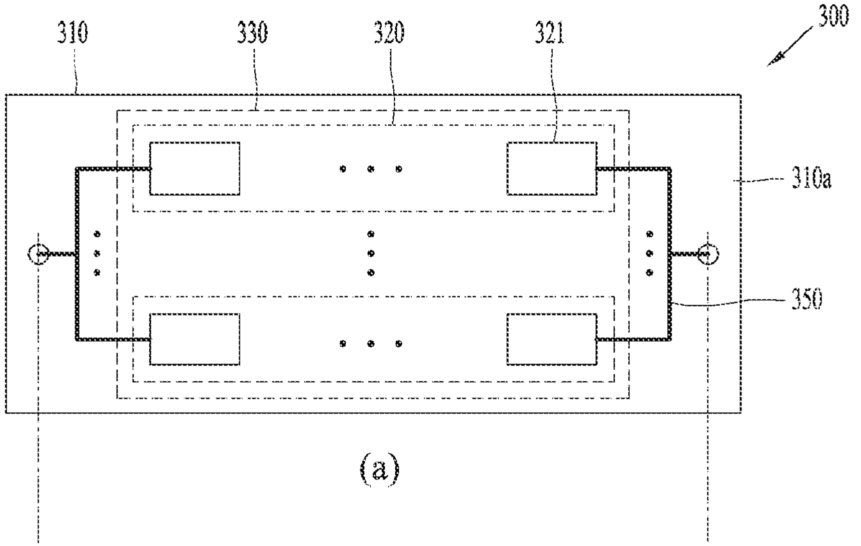
FIG. 3 is an exploded view illustrating a structure in which at least one overvoltage suppression element is connected through a patterned fuse according to an embodiment of the present disclosure, and a structure of an overvoltage suppression unit according to an embodiment of the present disclosure, the overvoltage suppression unit including the patterned fuse, the at least one overvoltage suppression element, and a first case.
Figure 3:
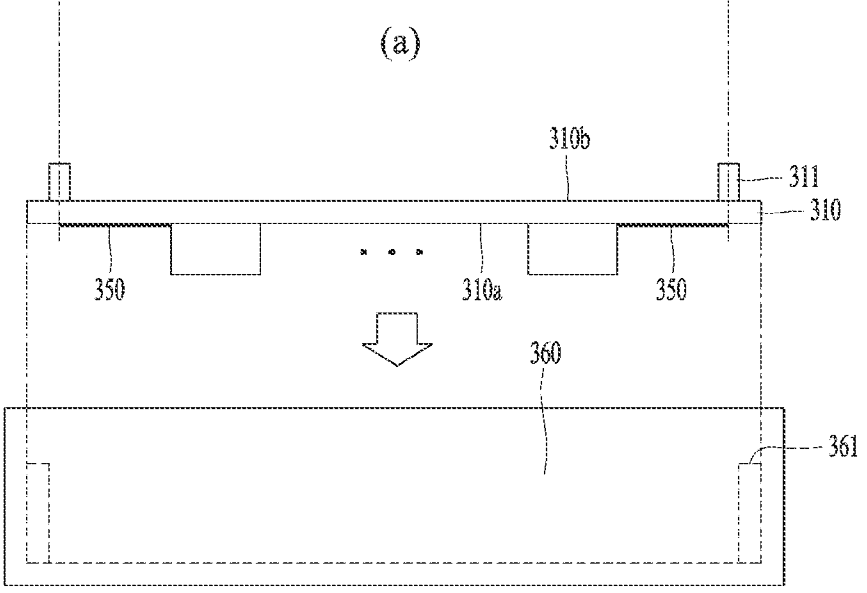

FIG. 3 is an exploded view illustrating a structure of an overvoltage suppression unit 300 in which at least one overvoltage suppression element 321 is connected through a pattern fuse 350, and a structure of the overvoltage suppression unit 300 including the pattern fuse 350, the at least one overvoltage suppression element 321, and a first case 360, according to an embodiment of the present disclosure.

(a) of FIG. 3 illustrates an example of a printed circuit board 310 of the overvoltage suppression unit 300 according to an embodiment of the present disclosure. (b) of FIG. 3 is a diagram illustrating an example of the first case 360 covering the printed circuit board 310 of the overvoltage suppression unit 300.

Referring to (a) of FIG. 3, the at least one overvoltage suppression element 321 may be disposed on a first surface 310*a* of the printed circuit board 310 of the overvoltage suppression unit 300. Here, one or more overvoltage suppression elements 321 may be arranged depending on a magnitude of a voltage to be suppressed. For example, as shown in (a) of FIG. 3, a plurality of overvoltage suppression elements may be connected to each other in series to constitute one overvoltage suppression element array 320, and a disposition 330 of a plurality of such overvoltage suppression element arrays 320 may be configured.

Here, the plurality of overvoltage suppression elements (the overvoltage suppression element array 320) connected to each other in series may be used as one overvoltage suppression element. In this case, a maximum voltage that may be suppressed by the overvoltage suppression element array 320 may be a voltage corresponding to a sum of magnitudes of threshold voltages to be suppressed by respective overvoltage suppression elements constituting the overvoltage suppression element array 320.

A plurality of overvoltage suppression element arrays 320 may be connected to each other in parallel as shown in (a) of FIG. 3. In this case, the overvoltage suppression element arrays 320 connected to each other in parallel may be used as separate overvoltage suppression elements.

Here, the overvoltage suppression element arrays 320 may be connected to each other through the fuse 350 (hereinafter referred to as the pattern fuse) patterned on the printed circuit board 310 of the overvoltage suppression unit 300. To do so, the pattern fuse 350 may be disposed on both ends of at least one overvoltage suppression element array 320, and each pattern fuse 350 disposed thereon may be patterned to be connected to one end of each overvoltage suppression element array 320 adjacent thereto.

Additionally, the pattern fuse 350 may be patterned on one surface 310*a* of the printed circuit board 310 of the overvoltage suppression unit 300. Accordingly, the overvoltage suppression element arrays 320 connected to each other through the pattern fuse 350 may also be disposed on the one surface 310*a* of the printed circuit board 310. Hereinafter, the one surface 310*a* of the printed circuit board 310 of the overvoltage suppression unit 300 on which the pattern fuse 350 and the plurality of overvoltage suppression elements 321 are disposed is referred to as a first surface, and another surface of the printed circuit board 310 on which the pattern fuse 350 and the plurality of overvoltage suppression elements 321 are not disposed is referred to as a second surface 310*b*.

Meanwhile, the pattern fuse 350 patterned on the first surface 310*a* of the printed circuit board 310 may be connected to a lead wire inlet 311 disposed on the second surface 310*b* of the printed circuit board 310. The lead wire inlet 311 may include lead wires that penetrate through the printed circuit board 310 and connect the first surface 310*a* to the second surface 310*b* of the printed circuit board 310. The lead wires may be disposed to be respectively connected to a fuse patterned on the first surface 310*a* of the printed circuit board 310, i.e., the pattern fuse 350.

Here, the lead wire inlet 311 may be disposed on the second surface 310*b* of the printed circuit board 310 of the overvoltage suppression unit 300. Additionally, the pattern fuse 350 and the at least one overvoltage suppression element 321 may be disposed on the first surface 310*a* of the printed circuit board 310.

That is, the lead wire inlet 311 may be disposed on a surface (i.e., a rear surface) other than a surface of the printed circuit board 310 on which the pattern fuse 350 and the at least one overvoltage suppression element 321 are disposed. Accordingly, since a space in which a semiconductor switch for power is located and a space in which the overvoltage suppression elements 321 are disposed are separate from each other, even when the overvoltage suppression elements 321 are damaged due to overvoltage, an impact on the semiconductor switch for power may be minimized.

Meanwhile, as shown in (b) of FIG. 3, the first surface 310*a* of the printed circuit board 310 of the overvoltage suppression unit 300 on which the pattern fuse 350 and the at least one overvoltage suppression element 321 are disposed may be covered by the first case 360 constituting a housing. The first case 360 may be made of a flame-retardant material to prevent an arc that may occur when the pattern fuse 350 is blown from being leaked and protect components outside the overvoltage suppression unit 300 from heat caused by the arc.

For example, the first case 360 may be formed through impregnation of an epoxy resin which is a thermosetting resin, that is, impregnation of epoxy. In addition, the printed circuit board 310 and circuit elements disposed on the printed circuit board 310 may also be formed through impregnation of epoxy.

Additionally, as shown in (b) of FIG. 3, a seating groove 361 may be disposed in the first case 360 in which the printed circuit board 310 may be seated. In addition, the first surface 310*a* of the printed circuit board 310 may be seated in the seating groove 361. Accordingly, an internal space in which the at least one overvoltage suppression element 321 may be disposed may be provided between the first surface 310*a* of the printed circuit board 310 and the housing constituted by the first case 360.

In addition, a space inside the housing constituted by the first case 360 may be sealed by the first surface 310*a* of the printed circuit board 310 which has been seated and the first case 360. Therefore, when the pattern fuse 350 patterned on the first surface 310*a* of the printed circuit board 310 is blown to thereby cause generation of an arc, the arc may be blocked, by the first case 360, from being leaked. That is, elements outside the first case 360 may be protected by the first case 360 from the arc generated when the pattern fuse 350 is blown.

Meanwhile, the lead wire inlet 311 may be disposed such that a lead connection wire extending from the printed circuit board of the semiconductor circuit breaker is inserted into the lead wire inlet 311. In addition, the lead connection wire may penetrate through the printed circuit board of the semiconductor circuit breaker and connect a front surface (hereinafter referred to as a first surface) of the semiconductor circuit breaker, on which circuit elements are disposed, to a rear surface (hereinafter referred to as a second surface) of the semiconductor circuit breaker on which circuit elements are not disposed.

The lead connection wire may be disposed to protrude from the second surface. In this case, the lead connection wire may be connected to both ends of the semiconductor switch unit including semiconductor switches for power in the semiconductor circuit breaker.

Therefore, the overvoltage suppression unit 300 according to an embodiment of the present disclosure may be connected to the both ends of the semiconductor switch unit disposed on the first surface (a surface on which the circuit elements are disposed) of the printed circuit board of the semiconductor circuit breaker through the pattern fuse 350 via the lead connection wire and a lead wire of the lead wire inlet 311.

Meanwhile, the overvoltage suppression unit 300 may be combined with the second surface of the printed circuit board of the semiconductor circuit breaker so that the lead wire inlet 311 may be combined with the second surface of the printed circuit board of the semiconductor circuit breaker from which the lead connection wire protrudes.

In addition, the lead wire inlet 311 is disposed on the second surface of the overvoltage suppression unit 300 on which the pattern fuse 350 and the overvoltage suppression elements 321 are not disposed. Thus, the overvoltage suppression unit 300 according to an embodiment of the present disclosure may be disposed such that the first surface of the semiconductor circuit breaker on which the pattern fuse 350 and the at least one overvoltage suppression element 321 are disposed is directed toward a same direction as a direction toward which the second surface on which the circuit elements are not disposed.

Therefore, when parts inside the overvoltage suppression unit 300 are damaged due to blowing of the pattern fuse 350 or overvoltage, an arc caused by blowing of the pattern fuse 350 and scattering objects caused by a damage to the parts may be discharged in a direction different from that in which the circuit elements inside the semiconductor circuit breaker are disposed. Accordingly, even when the pattern fuse 350 is blown due to overvoltage exceeding a threshold, the circuit elements inside the semiconductor circuit breaker may be blocked from the arc and the scattering objects according to a direction toward which circuit elements disposed in the semiconductor circuit breaker are directed.

In addition, a damage to parts outside the overvoltage suppression unit 300 may be prevented by preventing the arc and the scattering objects from being discharged out of the overvoltage suppression unit 300 through the first case 370.

As such, in the present disclosure, a size of a fuse may be greatly reduced by using a fuse (pattern fuse) patterned on the printed circuit board of the overvoltage suppression unit 300. Also, an arc that may be generated by using a pattern fuse may be prevented from being leaked out of an overvoltage suppression unit 500 by covering the pattern fuse and the overvoltage suppression element with the first case 370. Accordingly, the overvoltage suppression unit 500 in the present disclosure has advantages of not only being used to suppress a high voltage equal to or greater than a certain level, but also having a small size.

Meanwhile, with reference to FIG. 3, an example of blocking an arc discharged from the first surface 310*a* of the printed circuit board 310 on which a fuse is patterned, through the first case 360 covering the first surface 310*a* of the printed circuit board 310.

However, due to characteristics of an arc that may be discharged in all directions, the arc may be discharged not only in a direction toward which the first surface 310*a* of the printed circuit board 310 is directed (a direction which the first 310*a* faces), but also in a rear direction of the first surface 310*a* (a direction which the second surface 301*b* faces). Accordingly, the second surface 310*b* of the overvoltage suppression unit 500, as well as the first surface 310*a* thereof, may be covered by a case made of a material similar to that of the first case 360 to block an arc discharged through the second surface 310*b*.

Figure 4:
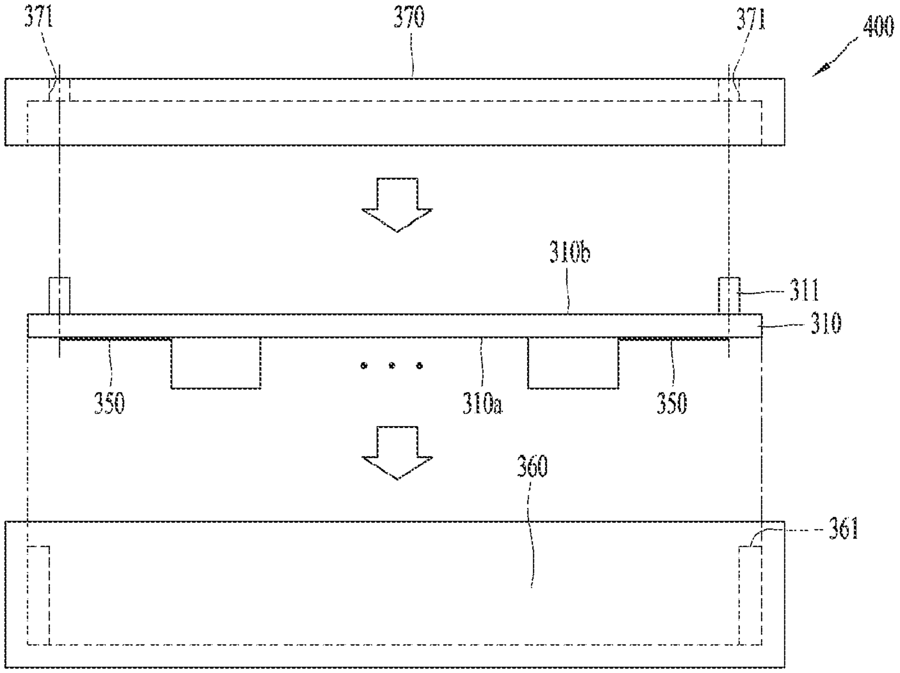
FIG. 4 illustrates an example of a structure of the overvoltage suppression unit including a first case covering a first surface of a printed circuit board on which a fuse is patterned, and a second case covering a second surface other than the first surface according to an embodiment of the present disclosure.
Figure 4:
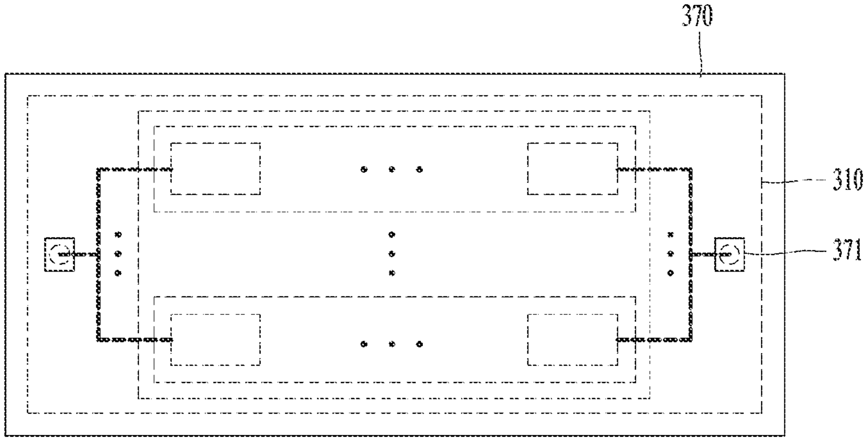

FIG. 4 illustrates an example of an overvoltage suppression unit 400 including the first case 360 covering a first surface 310*a* of the printed circuit board 310 on which a fuse is patterned, and a second case 370 covering a second surface 310*b* other than the first surface 310*a* according to an embodiment of the present disclosure.

Referring to FIG. 4, (a) of FIG. 4 is an exploded view illustrating a structure of the overvoltage suppression unit 400 in which the second case 370 is to be combined. In addition, (b) of FIG. 4 illustrates an example of the overvoltage suppression unit 400 in which the first case 360 is combined with the second case 370.

First, referring to (a) of FIG. 4, the overvoltage suppression unit 400 according to another embodiment of the present disclosure may further include the second case 370 covering the second surface 310*b* of the printed circuit board 310, in addition to the first case 360 covering the first surface 310*a* of the printed circuit board 310 as described with reference to FIG. 3.

The second case 370 may include through holes 371 through which two lead wire inlets 311 disposed on the second surface 310*b* of the printed circuit board 310 may penetrate. Additionally, although not illustrated, the second case 370 may include a seating groove inside which the second surface 310*b* of the printed circuit board 310 may be seated.

Therefore, when the second surface 310*b* of the printed circuit board 310 combined with the first case 360 is seated along the seating groove, the lead wire inlets 311 may be inserted into each of the through holes 371, thereby combining the printed circuit board 310 with and the second case 370. In addition, the second surface 310*b* of the printed circuit board 310 may be covered by the second case 370, and a space between the second surface 310*b* of the printed circuit board 310 and a second surface of the printed circuit board of the semiconductor circuit breaker may be blocked.

In this case, the second case 370 may constitute a housing to cover the second surface 310*b* of the printed circuit board 310. Accordingly, when the second surface 310*b* of the printed circuit board 310 is seated, a sealed internal space having a certain size may be defined between the second surface 310*b* and the housing constituted by the second case 370. Therefore, when an arc is generated by blowing of the fuse, the generated arc may be discharged into an internal space defined between the second surface 310*b* of the printed circuit board 310 and the housing constituted by the second case 370.

Meanwhile, the lead wire inlet 311 may be disposed such that a lead wire extending from the printed circuit board of the semiconductor circuit breaker is inserted therein. Therefore, in the overvoltage suppression unit 400 according to another embodiment of the present disclosure, a combination may be performed such that at least a part of an outer upper surface of the second case 370 is in contact with the second surface of the printed circuit board of the semiconductor circuit breaker.

That is, a combination body including the first case 360, the printed circuit board 310, and the second case 370, each shown in (b) of FIG. 4, may be combined with the second surface of the printed circuit board of the semiconductor circuit breaker. Here, the second surface of the printed circuit board of the semiconductor circuit breaker may mean a surface of the printed circuit board of the semiconductor circuit breaker on which circuit elements are not disposed.

In addition, the lead wire inlet 311 may be disposed such that a lead wire extending from the printed circuit board of the semiconductor circuit breaker is inserted into the lead wire inlet 311. Additionally, the lead wire may be disposed to penetrate through the printed circuit board of the semiconductor circuit breaker to protrude from the a second surface of the semiconductor circuit breaker, other than the first surface on which various circuit elements are disposed. Accordingly, the overvoltage suppression unit 400 according to an embodiment of the present disclosure may be combined with a rear surface (second surface) of a surface (first surface) of the printed circuit board of the semiconductor circuit breaker on which the circuit elements are disposed.

Therefore, the overvoltage suppression unit 400 according to an embodiment of the present disclosure may be disposed such that the first surface 310*a* on which the pattern fuse and the at least one of overvoltage suppression element are disposed is directed toward a same direction as a direction toward which the second surface is directed, the second surface being other than the first surface of the semiconductor circuit breaker on which various circuit elements are disposed, Thus, when parts inside the overvoltage suppression unit 400 are damaged due to blowing of the pattern fuse or overvoltage, the circuit elements inside the semiconductor circuit breaker may be primarily protected from an arc caused by blowing of the pattern fuse 350 and scattering objects caused by a damage to the parts by differentiating a direction toward which a surface on which the circuit elements are disposed.

In addition, secondarily, the arc and the scattering objects may be prevented from being discharged out of the overvoltage suppression unit 300 through the first case 370, and a space between the overvoltage suppression unit 400 and the printed circuit board of the semiconductor circuit breaker may be blocked through the second case 360. Thus, external components of the overvoltage suppression unit 300 and the printed circuit board of the semiconductor circuit breaker may be prevented from being damage.

Hereinafter, a semiconductor circuit breaker in which the overvoltage suppression unit 300 or 400 according to an embodiment of the present disclosure is connected to both ends of a semiconductor switch for power is to be described with reference to FIGS. 5 to 7. In the following description, for convenience of explanation, an example of using a transient voltage suppressor (TVS) element as an overvoltage suppression element is described. However, it is only an assumption for convenience of explanation, and the present disclosure is not limited thereto.

Figure 5:
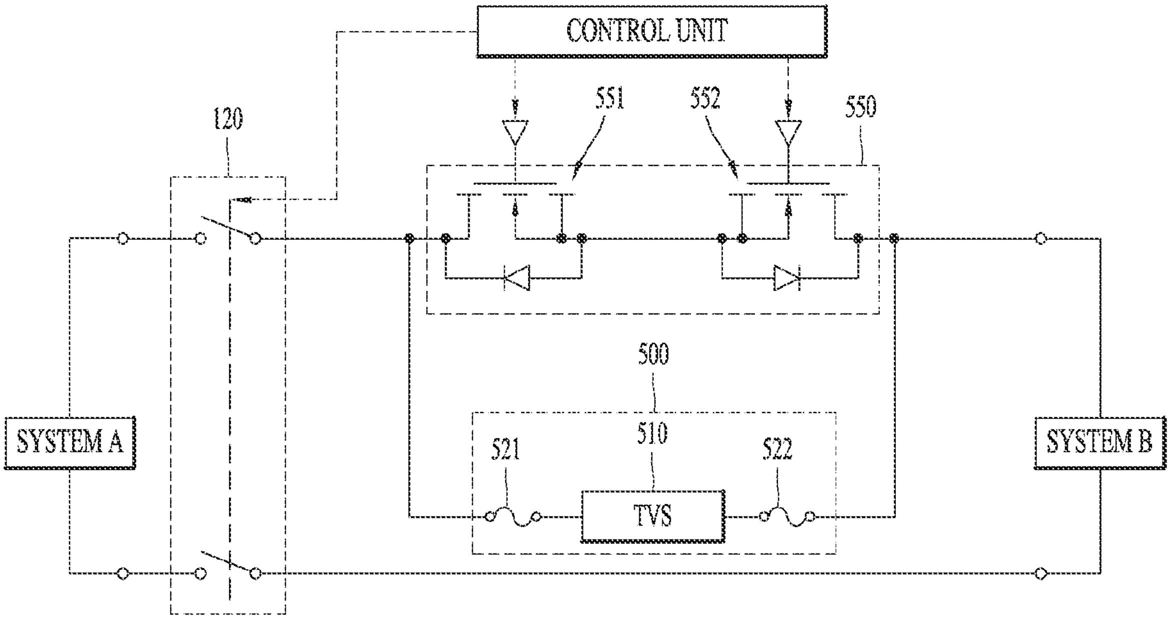
FIG. 5 illustrates an example of a structure of the semiconductor circuit breaker including the overvoltage suppression unit according to an embodiment of the present disclosure, the overvoltage suppression unit including overvoltage suppression elements connected through the patterned fuse.

FIG. 5 illustrates an example of a structure of a semiconductor circuit breaker having an overvoltage suppression unit including at least one overvoltage suppression element connected through a patterned fuse, according to an embodiment of the present disclosure.

Referring to FIG. 5, the semiconductor circuit breaker according to an embodiment of the present disclosure may include the overvoltage suppression unit 500 connected to both ends of a semiconductor switch unit 550 including a first semiconductor switch 551 for power and a second semiconductor switch 552 for power connected to each other in series, and disposed in parallel with the semiconductor switch unit 550. Here, the overvoltage suppression unit 500 may be the overvoltage suppression unit 300 according to an embodiment of the present disclosure described with reference to FIG. 3 or the overvoltage suppression unit 400 according to another embodiment of the present disclosure described with reference to FIG. 4.

Meanwhile, the overvoltage suppression unit 500 may include at least one TVS element 510 as at least one overvoltage suppression element. In addition, a first pattern fuse 521 disposed between one end of the TVS element 510 and one end of the semiconductor switch unit 550 may be included. Additionally, the overvoltage suppression unit 500 may include a second pattern fuse 522 disposed between another end of the TVS element 510 and another end of the semiconductor switch unit 550.

Here, the first pattern fuse 521 may protect the TVS element 510 from overvoltage caused by excessive residual current applied from a system A, and the second pattern fuse 522 may protect the TVS element 510 from excessive residual current applied from a system B.

Meanwhile, the overvoltage suppression unit 500 including the first pattern fuse 521, the second pattern fuse 522, and the TVS element 510 may be disposed on a second surface, other than a first surface of the printed circuit board on which circuit elements of the semiconductor circuit breaker are disposed.

Figure 6:
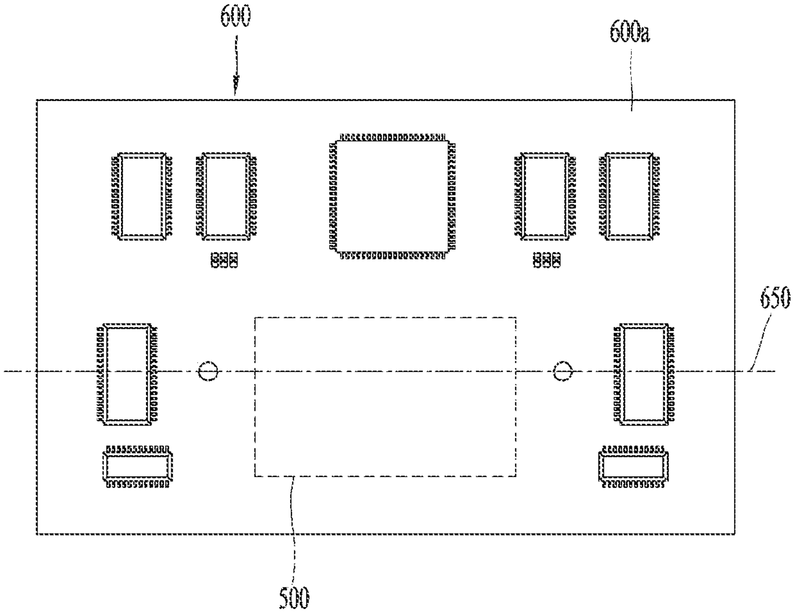
FIG. 6 illustrates an example of the first surface of the printed circuit board on which components inside the semiconductor circuit breaker including the overvoltage suppression unit according to an embodiment of the present disclosure are disposed, and a second surface other than the first surface.
Figure 6:
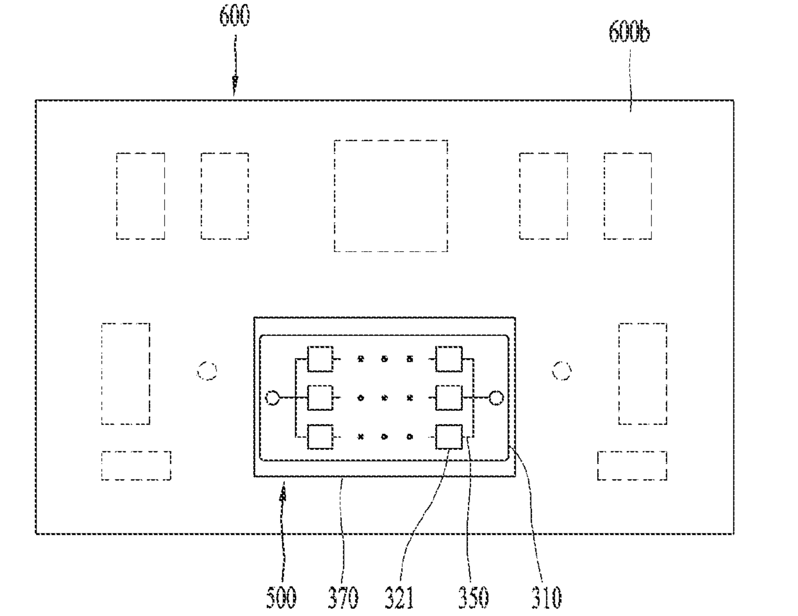

FIG. 6 illustrates an example of a first surface 600*a* of a printed circuit board 600 on which circuit elements in a semiconductor circuit breaker are arranged, and the printed circuit board 600 of the semiconductor circuit breaker having the overvoltage suppression unit 500 disposed on a second surface 600*b* other than the first surface 600*a*, according to an embodiment of the present disclosure.

(a) of FIG. 6 illustrates an example of the first surface 600*a* of the printed circuit board 600 of the semiconductor circuit breaker according to an embodiment of the present disclosure. In addition, (b) of FIG. 6 illustrates an example of the second surface 600*b*, other than the first surface 600*a*.

Referring to (a) of FIG. 6, circuit elements other than those constituting the overvoltage suppression unit 500 may be disposed on the first surface 600*a* of the printed circuit board 600 of the semiconductor circuit breaker according to an embodiment of the present disclosure. As an example, various circuit elements corresponding to a control unit, a first semiconductor switch for power, a second semiconductor switch for power, etc. may be disposed on the first surface 600*a* of the printed circuit board 600.

Meanwhile, as illustrated in (a) of FIG. 6, the overvoltage suppression unit 500 may not be disposed on the first surface 600*a* of the printed circuit board 600. The overvoltage suppression unit 600 may be disposed on a surface (the second surface 600*b*), other than the first surface 600*a* of the printed circuit board 600 on which other circuit elements are disposed.

In this case, as illustrated in (a) of FIG. 6, circuit elements may not be disposed in one region of the first surface 600*a* of the printed circuit board 600 corresponding to one region of the second surface 600*b* on which the overvoltage suppression unit 500 is disposed. That is, the first surface 600*a* of the printed circuit board 600 of the semiconductor circuit breaker according to an embodiment of the present disclosure may include a region in which the circuit elements are not disposed.

Meanwhile, the second surface 600*b* of the printed circuit board 600 of the semiconductor circuit breaker may mean a rear surface of the first surface 600*a* of the breaker printed circuit board 600 of the semiconductor circuit breaker, the first surface 600 having thereon circuit elements corresponding to components other than the overvoltage suppression unit 500. In addition, as illustrated in (b) of FIG. 6, the overvoltage suppression unit 500 according to an embodiment of the present disclosure may be disposed on the rear surface 600*b* of the printed circuit board 600 of the semiconductor circuit breaker.

Accordingly, a space in which a semiconductor switch for power is present (the first surface 600*a*) may be separate from a space in which the overvoltage suppression elements 321 are disposed (the second surface 600*b*). Thus, even when at least some of the overvoltage suppression elements 321 are damaged due to overvoltage, an impact on the semiconductor switch for power may be minimized.

In this case, the overvoltage suppression unit 500 may be disposed such that the second surface 310*b* of the printed circuit board 310 of the overvoltage suppression unit on which the overvoltage suppression elements 321 are not disposed faces the second surface 600*b* of the printed circuit board 600 of the semiconductor circuit breaker. Therefore, as illustrated in (b) of FIG. 6, the overvoltage suppression elements 321 may be disposed to be directed toward a same direction as a direction toward which the second surface 600*b* of the printed circuit board 600 of the semiconductor circuit breaker is directed.

Accordingly, an arc or scattering objects that may be caused by overvoltage exceeding a threshold may be discharged in a direction opposite to a direction in which the printed circuit board 600 of the semiconductor circuit breaker is disposed. In this case, although not illustrated in (b) of FIG. 6, the first case 370 may be disposed to cover the overvoltage suppression unit 500 disposed on the second surface 600*b* of the printed circuit board 600 of the semiconductor circuit breaker. Thus, the arc or the scattering objects may be prevented from being discharged out of the overvoltage suppression unit 500.

Figure 7:
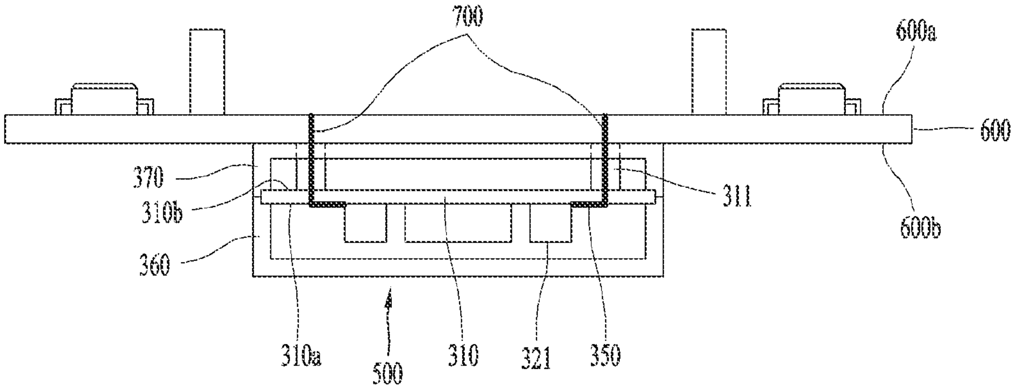
FIG. 7 is a sectional view of the printed circuit board in the semiconductor circuit breaker taken along a cutting line of FIG. 6.

Meanwhile, FIG. 7 is a sectional view of the printed circuit board 600 and the overvoltage suppression unit 500 each in the semiconductor circuit breaker taken along a cutting line 650 of FIG. 6.

Lead connection wires 700 connected to both ends of the semiconductor switch unit 550 of the semiconductor circuit breaker according to an embodiment of the present disclosure may be disposed to protrude through the printed circuit board 600, as illustrated in FIG. 7. Accordingly, the lead connection wires 700 may be disposed to penetrate through the printed circuit board 600 to connect the first surface 600*a* of the printed circuit board 600. on which each semiconductor switch for power is disposed, to a rear surface of the first surface 600*a*, i.e., the second surface 600*b*.

Meanwhile, the lead connection wires 700 protruding from the second surface 600*b* of the printed circuit board 600 may be introduced through each lead wire inlet 311 of the overvoltage suppression unit 500, In addition, the lead connection wires 700 may be connected to pattern fuses 360 through lead wires included in each lead wire inlet 311.

Here, the pattern fuses 350 may be connected through at least one overvoltage suppression element 321. Therefore, as illustrated in FIG. 7, in the semiconductor circuit breaker according to an embodiment of the present disclosure, both ends of the semiconductor switch unit disposed on the first surface 600*a* of the printed circuit board 600 may be connected to the at least one overvoltage suppression element 321 disposed on the printed circuit board 310 of the overvoltage suppression unit 500 combined with the second surface 600*b* of the printed circuit board 600 of the semiconductor circuit breaker.

In addition, the both ends of the semiconductor switch unit may be connected to the overvoltage suppression element 321 through the lead connection wires penetrating through the printed circuit board 600 of the semiconductor circuit breaker and the lead wires penetrating through the printed circuit board 310 of the overvoltage suppression unit 300 via the pattern fuses 350 patterned on the printed circuit board 310 of the overvoltage suppression unit 300.

Meanwhile, as illustrated in FIG. 7, circuit elements other than the overvoltage suppression unit 500 may be disposed on the first surface 600*a* of the printed circuit board 600 of the semiconductor circuit breaker, and circuit elements constituting the overvoltage suppression unit 500 may be disposed on the second surface 600*b* of the printed circuit board 600 of the semiconductor circuit breaker.

Therefore, the circuit elements constituting the overvoltage suppression unit 500 (e.g., overvoltage suppression elements) and the other circuit elements of the semiconductor circuit breaker (e.g., the semiconductor switch for power, the control unit, etc.) may be disposed in different directions as illustrated in FIG. 7.

In addition, in the printed circuit board 310 of the overvoltage suppression unit 500, the first surface 310*a* on which the overvoltage suppression elements 321 are disposed may be sealed by the first case 360 constituting a housing together with the printed circuit board 310, and the second surface 310*b* on which the overvoltage suppression elements 321 are not disposed may be sealed by the second case 370 constituting a housing together with the printed circuit board 310.

Therefore, the overvoltage suppression unit 500 according to an embodiment of the present disclosure may block an arc generated when the pattern fuse 350 is blown and scattering objects that may be generated due to a damage by overvoltage exceeding a threshold from being discharged in both directions (a direction toward the first surface 310*a* and a direction toward the second surface 310*b*) of the printed circuit board 310.

Meanwhile, in the above description, a configuration in which a lead wire protruding from a printed circuit board in a semiconductor circuit breaker is connected to a printed circuit board of the overvoltage suppression unit 500 through the lead wire inlet 311 is described. However, a printed circuit board of the overvoltage suppression unit 500 and a printed circuit board of the semiconductor circuit breaker may constitute one printed circuit board.

In this case, the printed circuit board of the semiconductor circuit breaker may be partitioned into a region in which an overvoltage suppression unit is disposed and another region. Additionally, circuit elements constituting the overvoltage suppression unit may be disposed on a second surface, that is, a surface other than a first surface of the printed circuit board on which other circuit elements are disposed. Therefore, the printed circuit board of the semiconductor circuit breaker may include a first region in which circuit elements are arranged on the second surface (a region in which circuit elements constituting the overvoltage suppression unit are disposed), and a second region in which circuit elements are arranged on the first surface (a region in which components other than those of the overvoltage suppression unit are disposed).

To do so, the printed circuit board of the semiconductor circuit breaker may be a board coated so that circuit elements may be disposed on both surfaces. Additionally, a fuse may be patterned on the second surface, and at least one overvoltage suppression element disposed on the second surface may be connected to each other through the patterned fuse.

In addition, the second surface of the second region in the printed circuit board of the semiconductor circuit breaker on which the patterned fuse and at least one overvoltage suppression element are disposed (a surface on which the circuit elements constituting the overvoltage suppression unit are disposed) may be covered by a case corresponding to a first case and made of a flame-retardant material. Additionally, the first surface (a surface on which the circuit elements constituting the overvoltage suppression unit are not disposed) of the second region may be covered by a case corresponding to a second case and made of a flame-retardant material. Also, in this disposition, the overvoltage suppression unit may be placed in a different region in one printed circuit board.

The detailed description provided above should not be limitedly construed in all aspects and should be considered as illustrative. The scope of the present disclosure should be determined by reasonable interpretation of the appended claims, and all changes within the scope of equivalents of the present disclosure are included in the scope of the present disclosure.

The invention claimed is:

1. An overvoltage suppression unit in a semiconductor circuit breaker, the overvoltage suppression unit comprising:

an overvoltage suppression element unit disposed on a first surface of a printed circuit board and comprising at least one overvoltage suppression element;

a pattern fuse connected to the at least one overvoltage suppression element and patterned on the first surface of the printed circuit board;

a first case constituting a housing and covering the first surface of the printed circuit board, the pattern fuse and the overvoltage suppression element unit being disposed on the first surface; and a lead wire connected to the pattern fuse, wherein the lead wire is disposed to connect the first surface of the printed circuit board to a second surface of the printed circuit board.

2. The overvoltage suppression unit of claim 1, wherein the overvoltage suppression unit further comprises a lead wire inlet which comprises the lead wire and is disposed on the second surface of the printed circuit board and into which a lead connection wire line protruding from a main printed circuit board of the semiconductor circuit breaker is introduced, the main printed circuit board of the semiconductor circuit breaker having circuit elements of the semiconductor circuit breaker disposed thereon, and the lead connection wire line is configured to:

penetrate through the main printed circuit board to connect a first surface of the main printed circuit board to a second surface other than the first surface, the circuit elements on the main printed circuit board being disposed on the first surface; and protrude from the second surface of the main printed circuit board and when being introduced into the lead wire inlet, is connected to the lead wire in the lead wire inlet.

3. The overvoltage suppression unit of claim 2, wherein the lead connection wire is connected to one end of a semiconductor switch unit in the semiconductor circuit breaker, the semiconductor switch unit comprising at least one semiconductor switch for power.

4. The overvoltage suppression unit of claim 2, wherein the overvoltage suppression unit is disposed on the second surface of the main printed circuit board so that the lead connection wire is introduced into the lead wire inlet, and the second surface of the main printed circuit board is disposed to face the second surface of the printed circuit board.

5. The overvoltage suppression unit of claim 4, wherein the overvoltage suppression unit comprises a second case covering the second surface of the printed circuit board to block a space between the second surface of the main printed circuit board and the second surface of the printed circuit board, and comprising a through hole through which the lead wire inlet penetrates.

6. The overvoltage suppression unit of claim 5, wherein the second case constitutes a housing, and defines a sealed internal space having a certain size between the second surface of the printed circuit board and the housing constituted by the second case such that an arc generated when the pattern fuse is blown is discharged into the sealed internal space.

7. The overvoltage suppression unit of claim 5, wherein at least one of the first case and the second case is made of a flame-retardant material.

8. The overvoltage suppression unit of claim 5, wherein at least one of the first case and the second case is configured by impregnating epoxy.

9. The overvoltage suppression unit of claim 5, wherein the printed circuit board and elements disposed on the printed circuit board are configured by impregnating epoxy.

10. The overvoltage suppression unit of claim 1, wherein the overvoltage suppression element unit comprises a plurality of overvoltage suppression element arrays in which a plurality of overvoltage suppression elements are connected to each other in series, and the pattern fuse connects the plurality of overvoltage suppression element arrays to each other to connect the plurality of overvoltage suppression element arrays in parallel with each other.

11. A semiconductor circuit breaker comprising the overvoltage suppression unit of claim 1 and further comprising:

a semiconductor switch unit comprising at least one semiconductor switch for power;

wherein:

the printed circuit board having the semiconductor switch unit disposed on a second surface;

the lead wire is one of a plurality of lead wires connecting the first surface of the printed circuit board to both ends of the semiconductor switch unit;

the overvoltage suppression element unit disposed on the first surface of the printed circuit board, and connected to the semiconductor switch unit in parallel through the plurality of lead wires to suppress a voltage increase caused by residual current generated from the both ends of the semiconductor switch unit when circuit connection is interrupted; and the pattern fuse is one of a plurality of pattern fuses connecting each of the plurality of lead wires to both ends of the overvoltage suppression element unit, and patterned on the first surface of the printed circuit board.

12. The semiconductor circuit breaker of claim 11, further comprising a first case covering one region of the first surface of the printed circuit board and made of a flame-retardant material, wherein the overvoltage suppression element unit is disposed and the plurality of pattern fuses are patterned on the second surface.

13. The semiconductor circuit breaker of claim 12, further comprising a second case covering one region of the second surface of the printed circuit board corresponding to the one region of the first surface of the printed circuit board on which the overvoltage suppression element unit is disposed and each pattern fuse of the plurality of pattern fuses is patterned, and made of a flame-retardant material.

14. The semiconductor circuit breaker of claim 11, wherein the printed circuit board is partitioned into a first region on which the overvoltage suppression element unit is disposed and the plurality of pattern fuses are patterned, and a second region on which circuit elements of the semiconductor circuit breaker, other than the overvoltage suppression element unit and the plurality of pattern fuses, are disposed, and the first region and the second region are disposed on different surfaces of the printed circuit board.

15. The semiconductor circuit breaker of claim 11, wherein the overvoltage suppression element unit comprises a plurality of overvoltage suppression element arrays in which a plurality of overvoltage suppression elements including the at least one overvoltage suppression element are connected to each other in series, and the plurality of pattern fuses connect the plurality of overvoltage suppression element arrays to each other to connect the plurality of overvoltage suppression element arrays in parallel with each other.

* * * * *